Oct. 16, 1962   P. MASTRAS   3,058,345
LIQUID METAL LEVEL INDICATOR
Filed Aug. 16, 1960

INVENTOR.
Paul Mastras
BY
Morse & Altman
ATTORNEYS 3,058,345
Patented Oct. 16, 1962

3,058,345
LIQUID METAL LEVEL INDICATOR
Paul Mastras, Lynn, Mass.
(194 E. Main St., Middletown, Conn.)
Filed Aug. 16, 1960, Ser. No. 49,976
6 Claims. (Cl. 73—304)

The present invention relates to level measurement and, more particularly, to a novel indicator for providing a continuous indication of the level of a liquid metal, the relative positioning of the indicator in a bore of a solid metal, etc. from maximum to minimum without mechanical movement and in terms of an electrical signal. The indicator of the present invention may be positioned within any enclosure that must be hermetically sealed in order to avoid exposure of its contents to the atmosphere but is nevertheless protected, for example, from the molten metal in which it is immersed.

The object of the present invention is to provide a metal level indicator of the foregoing type comprising a pair of inductors that are connected into a Wheatstone bridge circuit, and a pair of shields that differentially couple the inductors to the metal, the arrangement being such that as the level varies the impedances of the inductors vary differentially in a manner which is detected by the Wheatstone bridge. This level indicator is mechanically simply in construction and electrically simply in operation.

Other objects of the present invention will in part be obvious and will in part appear hereinafter.

For a fuller understanding of the nature and objects of the present invention, reference should be had to the following detailed disclosure, taken in connection with the accompanying drawing where:

Figure 1:
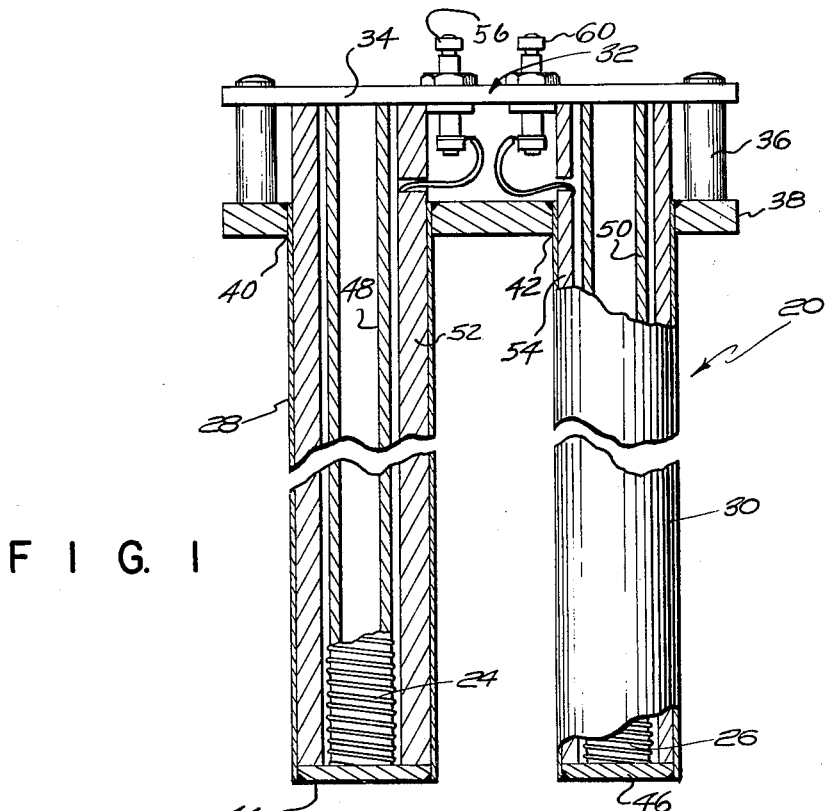
FIG. 1 is a cross-sectional mechanical view of a component of a preferred liquid metal level indicator embodying the present invention.
Figure 2:
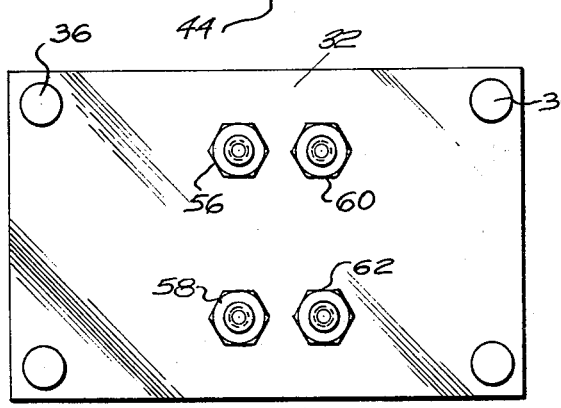
FIG. 2 is a top plan view of the indicator of FIG. 1.

Generally, the illustrated embodiment of the present invention comprises a mechanical component 20 including a pair of inductive coils 24, 26 that are differentially coupled to a liquid metal into which they depend and an electrical circuit by which the inductances of the coils, which vary differentially with the level of the liquid metal, are measured as a function of the height of the liquid metal. These coils for example, are composed of copper wire coated with tetrafluoroethylene.

As shown, the coils of unit 20, designated by 24 and 26, are identical in helical configuration, geometrical size and chemical composition. These coils are mounted within two depending tubular casings 28 and 30, which are mounted on a base 32 as follows. Base 32 includes a horizontal metal mounting plate 34 from which depend downwardly four metal posts 36. Connected to the lower extremities of posts 36 is a horizontal metal positioning plate 38 that is provided with apertures 40 and 42, through which casings 28 and 30 project. Casings 28 and 30 are composed of Inconel metal, being welded at the top within openings 40 and 42 of positioning plate 38 and being welded at the bottom to Inconel disk 44 and 46, which are seated therewithin. Coils 24 and 26 are wound on inner ceramic sleeves 48 and 50 of identical internal and external diameters. Coils 24 and 26 are encompassed by outer ceramic sleeves 52 and 54 of identical internal diameters but different external diameters forming spacers of different thicknesses. Sleeves 48, 52, 54 and 50 are positioned tightly between disks 44 and 46 and mounting plate 34. The terminals of coils 24 and 26 are connected to pairs of connectors 56, 58 and 60, 62.

Figure 3:
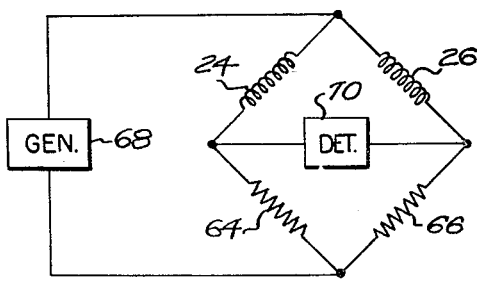
FIG. 3 is an electrical schematic diagram of a circuit embodying the component of FIG. 1.

The circuit of FIG. 3 is a simple bridge which operates from a power supply capable of impressing about 10 volts alternating current across a low impedance. Operating frequencies are in the audio range of 500 to 5000 cycles per second, best results being obtained at about 2,000 cycles per second. The detector is a vacuum tube voltmeter or other high impedance indicator. As shown, this circuit includes coils 24 and 26 and resistors 64 and 66, which constitute the elements of a Wheatstone bridge. Across the junction between the adjacent pair of coils and the junction between the adjacent pair of resistors is a frequency generator 68. Across the junction between one adjacent inductor and resistor pair and the other adjacent inductor and resistor pair is a detector 70. For convenience in the following analysis: coil 24 is indicated as having an impedance $Z_1$ and inductance $L_1$ and a resistance $R_1$; coil 26 is indicated as having an impedance $Z_2$, an inductance $L_2$ and a resistance $R_2$; resistor 64 is indicated as having an impedance $Z_3$ and a resistance $R_3$; resistor 66 is indicated as having an impedance $Z_4$ and a resistance $R_4$; the voltage across generator 68 is indicated as $E_t$; and the voltage across detector 70 is indicated as $E_0$.

The conditions of balance for an impedance bridge require that (1) $$\frac{L_1}{L_2} = \frac{R_3}{R_4}$$

and (2) $$\frac{R_1}{R_2} = \frac{R_3}{R_4}$$

therefore (3) $$\frac{L_1}{R_1} = \frac{L_2}{R_2}$$

or the phase angles of the coils be equal.

The initial or no-load balance, through any temperature range, although affecting $R_1$ and $R_2$, will equal zero per relation (3). As long as this relation is maintained, zero drift due to temperature will be eliminated or minimized.

The ratio of $R_3$ to $R_4$ must remain fixed through the entire operating range of the instrument because of the two conditions for balance per relations (1) and (2). Inductance changes or liquid level is indicated by the deflection of the indicator pointer.

The bridge circuit for conditions other than no-load follows this expression based on Thevenin's Theorem for an equivalent circuit, (4) $$E_0 = E_t \left[ \frac{Z_1}{Z_1 + Z_3} - \frac{Z_2}{Z_2 + Z_4} \right]$$

therefore:

(5) $$E_0 = E_t \frac{Z_1 Z_4 - Z_2 Z_3}{(Z_1 + Z_3)(Z_2 + Z_4)}$$

where, $E_0$ is the deflection of the detector in volts, and $E_t$ is the voltage across the bridge.

The ratio of $E_0$ at room temperature to $E_0'$ at elevated temperature may be expressed as follows:

(6)
$$\frac{E_0}{E_0'} = \frac{[jwR_3(L_1 - L_2)]}{[jwR_3(L_1' - L_2')]} \frac{[(R_1' + R_3 + jwL_1')(R_1' + R_3 + jwL_2')]}{[(R_1 + R_3 + jwL_1)(R_1 + R_3 + jwL_2)]} \times \frac{E_t}{E_t'}$$

where the primes (') are values at elevated temperature and ($w$) is equal to ($2\pi f$).

This relation holds true under such conditions that the temperatures of the coils are the same ($R_1 = R_2$) and ($R_1'=R_2'$), and the bridge ratio arms are constant ($R_3=R_4$).

Assuming $(L_1-L_2)=(L_1'-L_2')$, the expression for the change in the deflection of the detector from initial to final temperature depends on the coil resistance to the resistance of the bridge ratio arms and the ratio of $E_t$ to $E_t^1$. (Provided $R_1'+R_3 \gg jwl$, $R_1+R_3 \gg jwl_2$, $R_1'+R_3 \gg jwL_1'$, $R_1'+R_3 \gg wL_2'$).

The expression essentially becomes:

(7) $$\frac{E_0}{E_0'} = \frac{(R_1'+R_3)(R_2'+R_4)}{(R_1+R_3)(R_2+R_4)} \times \frac{E_t}{E_t'}$$

The assumption of $(L_1-L_2)=(L_1-L_2)$ can best be achieved by two physically identical coils. Although the dimensional instability of a coil due to temperature variations will affect the coil's pure inductance (L), the use of two identical coils should result in identical inductance changes and so will balance and not affect the indicator readings.

Using two identical coils in a bridge circuit restricts the values of Equations 1 and 2 to $$\frac{L_1}{L_2} = \frac{R_3}{R_4} = 1$$

and $$\frac{R_1}{R_2} = \frac{R_3}{R_4} = 1$$

Therefore the conditions ($R_1=R_2$), ($R_1'=R_2'$) and ($R_3=R_4$) will apply in Equation 6.

$E_t$ and $E_t'$ are dependent on the relation of the resistance of the bridge to the resistance of the generator per the expression:

(8) $$E_t = E_g \times \frac{Z \text{ (bridge)}}{Z \text{ (bridge)} + Z \text{ (generator)}}$$

where, $E_g$ is the generator's voltage
$Z$ (generator) is the impedance and (9) $$Z \text{ (bridge)} = \frac{(Z_1+Z_3)(Z_2+Z_4)}{Z_1+Z_2+Z_3+Z_4}$$

The ratio of $$\frac{E_t}{E_t'} = \frac{E_g \frac{Z \text{ (bridge)}}{Z \text{ (bridge)} + Z \text{ (generator)}}}{E_g \frac{Z' \text{ (bridge)}}{Z' \text{ (bridge)} + Z \text{ (generator)}}}$$

where, $Z_1$ is the bridge impedance at elevated temperatures.

After substitution of R, R', L, and L' values for Z (bridge) is becomes apparent that the ratio of $E_t$ to $E_t'$ decreases as the resistance $R_1'$ and $R_2'$ increases. Therefore, with correct impedance matching of the generator with the bridge circuit, the ratio of $E_0$ to $E_0'$ will remain close to unity.

The operation of the bridge coils is dependent on the expression

(10) $$Z_p \text{ (equivalent)} = Z_p + \frac{(wM)^2}{Z_s}$$

(10a) $$= Z_p + \frac{R_s(wM)^2}{(R_s)^2+(wL_s)^2} - j\frac{wL_s(wM_s)^2}{(R_s)^2+(wL_s)^2}$$

where, (s) represents the secondary of the coil, which in this case is the liquid metal
(p) represents the primary of the coil
(M) represents the mutual inductance which is equal to $K\sqrt{L_p L_s}$ and $$\frac{(wM)^2}{Z_s}$$

is the impedance coupled into the primary.

Because of the large cross-sectional area of the liquid metal $R_s$ can be considered equal to zero; therefore the above expression (10a) factors down to (10b) $$L_p(\text{equiv.}) = L_p(1^s - K_2)$$

where (K) is the coefficient of coupling.

In other words, the impedance of the coils in the bridge is only dependent on the coefficient of coupling and the mutual inductance of the coils. Thus, different outer diameters of sleeves 52 and 54 result in different variations in impedance.

The design of the container-tubes also is based on relations (10) and (10a). In this particular case both the resistive and inductive terms enter into the design calculations. Through proper choices of values for each term, together with an optimum frequency, the size of the tubes can be calculated as follows:

For a good approximation let $R_c$ (large tube)$=R_c$ (small tube).

For frequencies in the audio range, the value of $R_c$ is expressed by:

(11) $$R_c = \frac{2\pi\rho}{l \ln\frac{r_2}{r_1}}$$

where $\rho$ = resistivity of the material
$l$ = length of the tube
$r_2$ = radius to the outside
$r_1$ = radius to the inside Therefore the wall thickness of each container, for an electrical balanced pair of containers, depends on the ratio of outside to inside radius as follows:

(12) $$\frac{2\pi\rho}{l \ln\left(\frac{r_2}{r_1}\right)} \text{ large tube} = \frac{2\pi\rho}{l \ln\left(\frac{r_2}{r_1}\right)} \text{ small tube}$$

(12a) $$\left(\frac{r_2}{r_1}\right) \text{ large tube} = \left(\frac{r_2}{r_1}\right) \text{ small tube}$$

Although, in the illustrated embodiment the inductors are shown as having air cores, it is alternatively contemplated that the inductors be provided with magnetic cores, for example, laminated silicon steel or sintered ferromagnetic material, in which case relatively low Wheatstone bridge frequencies, i.e. 10 to 1,000 cycles per second, may be employed.

Since certain changes may be made in the illustrated embodiment of the present invention, it is intended that all matter contained in the foregoing description and shown in the accompanying drawings be interpreted in an illustrative and not in a limiting sense.

What is claimed is:

1. A liquid metal level indicator comprising a base, a first inductive component and a second inductive component extending from said base for immersion in a liquid metal, said first inductive component including a first inductor and a first spacer, said second inductive component including a second inductor and a second spacer, said first spacer separating at least a portion of said first inductor by a first distance from said liquid metal, said second spacer separating at least a portion of said second inductor by a second distance from said liquid metal, said first distance and said second distance being different.

2. The liquid metal level indicator of claim 1, wherein said first inductor and said second inductor are elements of a Wheatstone bridge circuit.

3. The liquid metal level indicator of claim 2, wherein said Wheatstone bridge includes as adjacent arms said first inductor and said second inductor and as adjacent arms a first resistor and a second resistor.

4. The liquid metal level indicator of claim 3, wherein said Wheatstone bridge includes a generator across the junction between the inductors and the junction between the resistors.

5. The liquid metal level indicator of claim 4, wherein said Wheatstone bridge includes a detector across the junction between one inductor and one resistor and the junction between the other inductor and the other resistor.

6. A liquid metal level indicator comprising a base, a first inductive component and a second inductive component extending from said base for immersion in a liquid metal, said first inductive component including a first inductor and a first spacer, said second inductive component including a second inductor and a second spacer, said first spacer separating at least a portion of said first inductor by a first distance from said liquid metal, said second spacer separating at least a portion of said second inductor by a second distance from said liquid metal, said first distance and said second distance being different, said first inductor and said second inductor being elements of a Wheatstone bridge circuit, a first resistor and a second resistor being other elements of said Wheatstone bridge circuit, a generator across the junction between said inductors and the junction between said resistors, and a detector across the junction between one inductor and one resistor and the junction between the other inductor and the other resistor, said first inductor and said second inductor being equal in length, said first spacer having an inner radius and an outer radius, said second spacer having an inner radius and an outer radius, said first spacer and said second spacer each being composed of a material of specified resistivity, said first spacer and said second spacer being related by the following equations:

$$\frac{2\pi\rho}{l \ln\left(\frac{r_2}{r_1}\right) \text{large tube}} = \frac{2\pi\rho}{l \ln\left(\frac{r_2}{r_1}\right) \text{small tube}}$$

$$\left(\frac{r_2}{r_1}\right) \text{large tube} = \left(\frac{r_2}{r_1}\right) \text{small tube}$$

where: $\rho$=said resistivity; $l$=said length; $r_2$=outside radius; and $r_1$=inside radius.

References Cited in the file of this patent

UNITED STATES PATENTS

| | | |
|---|---|---|
| 2,354,964 | Ostermann et al. | Aug. 1, 1944 |
| 2,485,579 | Elliott | Oct. 25, 1949 |
| 2,648,058 | Breedlove | Aug. 4, 1953 |
| 2,824,278 | Johnston | Feb. 18, 1958 |
| 2,949,576 | Bolton | Aug. 16, 1960 |

FOREIGN PATENTS

| | | |
|---|---|---|
| 513,427 | Great Britain | Oct. 12, 1939 |